United States Patent [19]
Hordijk et al.

[11] Patent Number: 5,176,518
[45] Date of Patent: Jan. 5, 1993

[54] MOVEMENT SIMULATOR

[75] Inventors: Jan Hordijk, Hoofddorp; Gerhard J. Wierda, Lisserbroek, both of Netherlands

[73] Assignee: Fokker Aircraft B.V., Schiphol, Netherlands

[21] Appl. No.: 672,377

[22] Filed: Mar. 20, 1991

Related U.S. Application Data

[63] Continuation of Ser. No. 493,291, Mar. 14, 1990, abandoned.

[51] Int. Cl.⁵ .............................................. G09B 9/00
[52] U.S. Cl. ......................................... 434/37; 434/58
[58] Field of Search ....................... 434/29, 55, 37, 58, 434/59, 61; 340/407; 272/28 R, 29, 45

[56] References Cited

U.S. PATENT DOCUMENTS

| | | | |
|---|---|---|---|
| 3,597,857 | 8/1971 | Akister | 434/58 |
| 4,559,014 | 12/1985 | Campbell | 434/58 |
| 4,576,577 | 3/1986 | Lam et al. | 434/58 |

Primary Examiner—Richard J. Apley
Assistant Examiner—Glenn Richman
Attorney, Agent, or Firm—Willian Brinks Olds Hofer Gilson & Lione

[57] ABSTRACT

The invention relates to a movement simulator having a support frame and a subframe movable relative to the support frame and connected by a variable element. A simple control assembly is electrically connected to the variable element for controlling its length. The transducer assembly having at least one acceleration transducer attached to the variable element supplies and an acceleration signal of a subframe relative to the support frame to the control assembly.

13 Claims, 4 Drawing Sheets

MOVEMENT SIMULATOR

This is a continuation of application Ser. No. 07/493,291, filed Mar. 14, 1990, which was abandoned.

The invention relates to a movement-simulator, comprising:

a frame to be immovably positioned, e.g. to be placed on the floor;

a subframe movable relative to said frame, e.g. for carrying a control unit and a seat for a user;

at least one variable element having a controllable length, such as a hydraulic cylinder, said element being coupled with said frame and carrying said subframe;

a central control assembly connected with the or each variable element for controlling the length thereof; and a transducer assembly for at least one parameter representative for the mechanical condition of said variable element, said transducer assembly supplying its output signal representative for the actual value of the related parameter to the central control assembly for comparison thereof with the instantaneous nominal value of the related parameter and adjusting the variable element until the actual value and the nominal value of the parameter substantially equal each other.

Such a movement-simulator is e.g. known from applicants' European patent application EP-B-0 051 896. This patent application discloses a flight simulator by means of which a user during a simulated flight is very realistically subjected to the force play also occurring during real flight circumstances. The movement-simulator according to the invention is not limited to flight simulators, but rather encompasses also other applications, in which one desires to be in a position to control force, acceleration, velocity and/or position to a movable subframe with high accuracy. E.g. a movement-simulator can also simulate the movements of tanks, trucks, ships or the like.

The mentioned European patent application EP-B-0 051 896 which is hereby disclosed by way of reference, relates to a flight simulator in which use is made of a force transducer and a position transducer. These transducers supply signals which are representative for the experienced force and the actual position, respectively, of the element, the position of which is variable. A computer calculates the nominal values of the related parameters, compares them with the measures, actual values and controls by means of a control assembly a hydraulic cylinder, until the parameters in question have the desired values, in other words, until the differences between the measured values and the actual values are substantially zero.

In the prior art flight simulator the force signal forms the basis. In order to control the control valve of the hydraulic cylinder with a signal proportional with the velocity, the force signal is subjected to a (variable) amplification or attenuation and subsequently integrated. The amplification factor therefore has the dimension of a mass. Dividing by the value of said mass, however, has two basic disadvantages. The related mass may never become a value approximating zero, since otherwise the gain in the related loop might become too large, as a result of which the system can no longer follow the nominal accelerations or there is a risk that the system is overloaded. Furthermore, the position in space of the hydraulic cylinders is during use of the apparatus strongly variable, as a result of which also the effective mass experienced thereby of the subframe can strongly vary. Thus, it is not realistic to give a divider according to the prior art a fixed adjustment. This adjustment would in any case has to be variable, so that the effective mass is always approximated as good as possible. In practice, however, this appears not to be realizable within the required, very high accuracy.

The accuracy, with which the system is able to perform the desired movements, has to be determined in view of the sensing threshold of the most experienced users. It appears that trained users are the most sensitive for sensing, "feeling", accelerations.

It is a purpose of the invention to modify the existing movement-simulator such that it is able to realize such a high degree of naturalness of the simulation, that even the most trained users experience the simulation as fully natural. In order to realize this purpose the movement-simulator according to the invention is characterized in that the transducer assembly comprises an acceleration transducer supplying an acceleration signal representative for the acceleration of the end of the variable element connected with said subframe.

In a movement-simulator of this type, in which the or each variable element can take a variable position in space dependent upon the actual mechanical condition, the problem arises that the acceleration transducer also measures the acceleration of gravity and is sensitive to spurious signals. These can e.g. be caused by disturbances from the "cockpit". In order to remove this disadvantage this movement-simulator can advantageously be characterized in that the acceleration transducer comprises two transducers, the first of which is arranged at the end of the variable element connected with said subframe and the second is arranged in the same position in space as, and particularly, aligned with said first transducer and is arranged at the end of the variable element connected with said frame, the output signals of said two transducers being subtracted from each other for forming the acceleration signal. As a result of the difference-arrangement the gravity component is eliminated from the measured acceleration, whilst furthermore the mentioned disturbances can substantially be eliminated.

It should be noted that the spacial position of both acceleration transducers have to be identical with a high accuracy. Therefore it will be generally necessary to align the two transducers.

Relative to the construction of acceleration transducers it should be noted that these are per se known transducers comprising a force transducer loaded with a fixed mass movable in one single direction. Such acceleration transducers are used as vibration sensors for measuring vibrations of constructions, such as walls, machine parts and the like. An acceleration transducer can supply an acceleration signal which is frequency-independent up to a previously chosen frequency, e.g. 50 Hz. The dimensioning of acceleration transducers is known in the related field and is beyond the frame of the present invention.

In order that the two transducers supply in a degree as high as possible identical signals that embodiment is preferred, of which the two transducers are arranged in substantially the same place.

Generally this will not be readily realizable.

In practice, therefore, often that embodiment will be preferred, in which the two transducers are placed on different positions and that the central control assembly calculates the acceleration signal on basis of the measured or calculated mechanical condition, e.g. the position in space, of the variable element. The arms relative to the hinging point of the variable element with the frame are in this configuration different. As a result of this the centrifugal acceleration experienced by both transducers differs. With reference to the measured or calculated position of the variable element with this embodiment a correction takes place, as a result of which the acceleration signal can be determined with efficient accuracy.

As has been discussed already in applicants' previous European patent application EP-B-0 051 896 it may make sense to also use a velocity signal and a position signal as a control signal for the variable element.

In view thereof a further embodiment is characterized by a first integrator, the input of which receives the acceleration signal and the output of which supplies a velocity signal serving as a control signal for the variable element.

Another embodiment is characterized by a second integrator, the input of which receives the velocity signal and the output of which supplies a position signal serving as a control signal for the variable element.

Under circumstances it may be desired to "stiffen" the hydraulic oil of the hydraulic cylinder, causing the Eigen-frequency of the variable element to be increased. In this connection it should be noted that as a result of the mass varying during the use of the apparatus the Eigen-frequency varies. Therefore a certain amount of force-feedback should be used, as was also the case in the system known from EP-B-0 051 896. In order to make this force-signal available the measured acceleration is multiplied with the effective mass calculated by the computer. The force-feedback according to the invention only serves as a correction or compensation term, whilst the acceleration signal forms the principle control basis. The acceleration is measured and multiplied with a calculated or measured mass in order to obtain the force. This calculation is performed by a computer, to which information regarding the mechanical condition of the subframe and/or the variable element is supplied. This corrected control appears to be able to very positively influence the simulation.

Preferably use is made of a summing circuit subjecting the acceleration signal, the velocity signal, the position signal each individually to a previously chosen or adjustable amplification or attenuation and subsequently sums those signals, the output signal of said summing circuit serving as a control signal for the variable element. With the aid thereof by means of a well-chosen relative adjustment the best simulation can be obtained.

As described, the optimum performance is obtained with an arrangement of two transducers arranged on the variable element, particularly a hydraulic cylinder.

Such arrangement has the inherent disadvantage that it requires a very accurate alignment of the two transducers. Such alignment has to be performed for every individual movement-simulator and for every cylinder individually. Furthermore, acceleration transducers are expensive devices.

Therefore, the invention provides a movement-simulator of the type described, in which the variable element is a hydraulic or pneumatic cylinder in which a piston is slidably arranged separating the cylinder in two compartments. This embodiment is characterized in that the acceleration transducer comprises two pressure transducers generating pressure signals representative of the pressures prevailing in the two respective compartments; multiplying means multiplying said pressure signals with the respective effective piston areas for generating respective force signals; subtracting means subtracting said force signals for generating an effective force signal; and dividing means dividing said effective force signal by the effective mass present at the end of the cylinder carrying said subframe, for generating an effective acceleration signal which signal is the output signal of the acceleration transducer.

Figure 1:
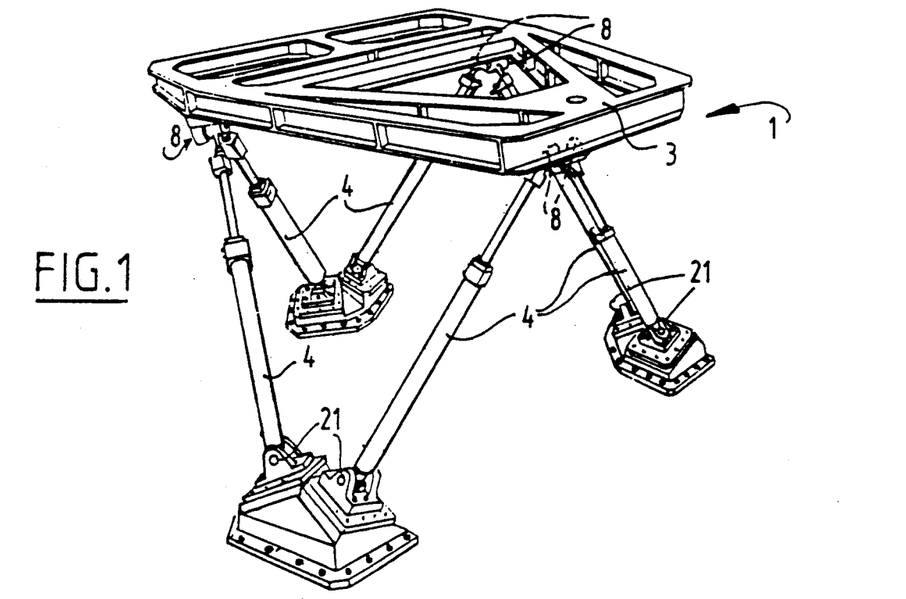
FIG. 1 is a schematic perspective view of a movement-simulator.

As shown in FIG. 1, the subframe 3 carrying the steering cabin including the seats and the pilot-trainee, is carried by the six hydraulic cylinders 4 under different and varying angles. This implies that during movement the mass "sensed" by one cylinder can substantially vary dependent upon the actual position of subframe 3. This basically is the explanation of the concept of "effective mass". This effective mass is not only determined by the apparatus itself, but rather also includes the weight of the trainee and the associated forces exerted by and on the respective cylinders.

Tests have proven that the feeling of naturalness is highly increased with a simulation in which the effective mass has been taken into account in the simulation procedure.

Basically, a position transducer should do the job without the need of other transducers. Namely, differentiating once relative to time gives the velocity; another differentation gives the acceleration. However, a differentiation to time implies multiplication by s or jw implying a 6 dB/octave gain increase, including noise. A double differentiation gives even 12 dB/octave additional noise. In order not to be hindered in the simulation by the access noise a drastic filtering is necessary limiting the upper frequency to about 1 or 2 Hz.

As an alternative, a force-transducer might be used. Of course, dividing the force by the related mass gives the acceleration. As explained above, the effective mass is not a constant, but is rather substantially variable. This means that the mass should be introduced on basis of a calculation or at least an estimation. This calculation cannot practically be performed. This is the reason why the most basic information is preferred, namely the acceleration.

On basis of an acceleration signal also velocity and position may be derived by integrating. Integrating, however, has the disadvantage of decreasing the gain by 6 dB/octave, limiting the power band width.

For this embodiment the designer can advantageously choose a cylinder that is already provided with the pressure transducers. Such cylinders are known per se and readily commercially available.

It should be noted that the effective mass at the free end of the cylinder carrying the subframe is actually varying with the actual mechanical condition of the subframe. Specifically in the case of a subframe having a larger number of degrees of freedom, particularly three translation degrees of freedom and three rotation degrees of freedom, the mass (including the rotational inertia moment) can appreciably vary. For an optimum performance giving a high-quality simulation of the actual movements sensed by the trainee, a more sophisticated embodiment can be preferred, which is characterized in that the effective mass is calculated by a computer previously fed with relevant parameters, such as mass (distribution) of the subframe, (rest) length of the cylinder, (rest) angle between the cylinder axis and the corresponding displacement of the subframe, said computer performing said calculation on basis of the instantaneous value of the actual position of the subframe for all degrees of freedom.

Clearly, the computer may form part of the central control assembly, since in this assembly or relevant instantaneous values are at any instant available.

It will be clear that the computer should perform a matrix-transformation transforming the relevant mechanical cylinder-data into the corresponding data regarding the effective motion of the subframe in all degrees of freedom. Such matrix-transformation would, on first side appear to be a disadvantage of this embodiment. It should, however, be noted that the computer software can basically be identical for every movement simulator and should only be adapted on basis of the actual mechanical parameters of the simulator involved, such as the above briefly mentioned mechanical parameters and the effective degrees of freedom. The software, therefore needs only be made once and can readily be accommodated to the actual situation. Complicated alignment-procedures are no longer required.

The invention will now be explained with reference to the accompanying drawing. Also reference is made to applicants' previous European patent application EP-B-0 051 896, in which per se known further details of movement-simulators of the present type are mentioned.

FIG. 1 shows a movement-simulator. This movement-simulator comprises a frame 2 placed in the floor and a subframe 3 movable relative to that frame 2, on which subframe e.g. a cockpit with a seat for a user may be fixed. The subframe 3 is movably carried by the frame 3 by means of six hydraulic cylinders, which all for the sake of convenience are referred to with the numeral 4. These hydraulic cylinders are connected with a non-shown central control assembly and a hydraulic system, by means of which the lengths of the hydraulic cylinders can be varied at will, e.g. under program control from a computer.

Figure 2:
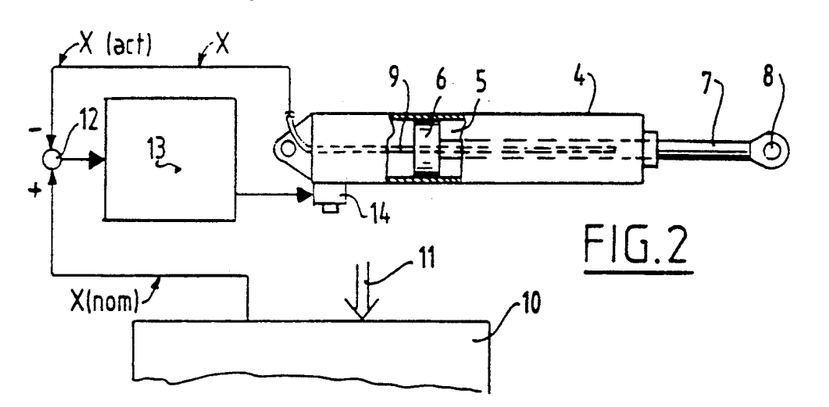
FIG. 2 is a strongly simplified control diagram according to the prior art.

FIG. 2 shows the control system, in which a hydraulic cylinder 4 is arranged. The hydraulic cylinder 4 comprises a cylinder house 5 and a plunger 7 connected with a piston 6. The variation in length of the hydraulic cylinder 4 is defined as the position difference between the cylinder house 5 and plunger 7, e.g. the end 8 thereof hingeably connected with said subframe 3. A linear position-transducer 9 supplies a position x. As a position-transducer a "linear variable differential transformer" or LVDT may be used. For larger displacement, however, an LVDT is no longer exactly linear. In that case preferably a "temposonic" transducer or other fully linear transducer may be applied.

The mentioned position signal x corresponds with the measured or actual position and will therefore from now on be referred to as x(act).

A computer 10 calculates on basis of input data 11, data present in a memory and the control program previously loaded into the computer, a desired or nominal position.

In FIG. 2 the related output signal of the computer is indicated with x(nom). A difference circuit 12 determines the difference between x(nom) and x(act) and supplies the difference signal to a control assembly 13 supplying a control signal to a control valve 14 controlling the feeding and outlet of oil under pressure to and from cylinder 4. With a fixed x(nom) on this way by means of the described control system a negative-feedback action takes place eliminating gradually the difference between x(nom) and x(act), until both positions equal each other.

Figure 3:
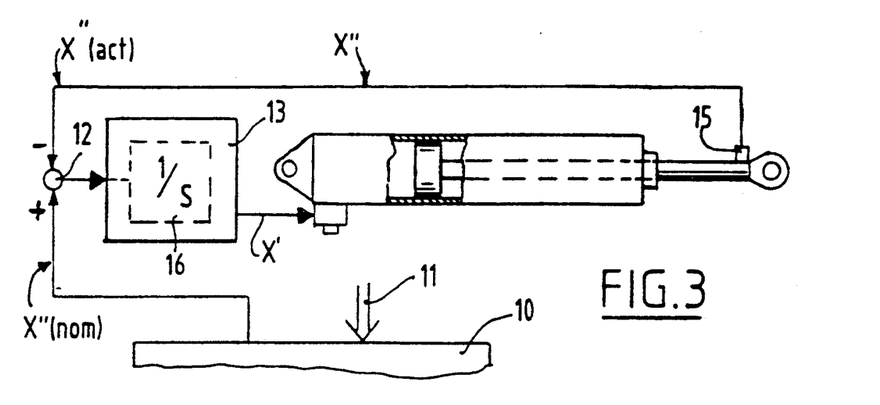
FIG. 3 is a schematic diagram corresponding to FIG. 2 of a control system according to the invention.

FIG. 3 shows a similar schematic diagram as in FIG. 2, in which, however, use is made of an acceleration transducer 15 supplying an acceleration signal x''. This corresponds with the measured or actual acceleration. In accordance with FIG. 2 in this connection the references x'' (act) and x'' (nom) are introduced. The reference x'' means a double differentiation of the position with time. The reference x' that will follow hereinafter means a single differentiation of the position with time.

As is indicated in FIG. 3 with interrupted lines, the control assembly 13 comprises an integrator 16 indicated with 1/s. In this case the signal to be supplied to the control valve corresponds no longer with an acceleration but rather with a velocity and is therefore indicated with x'.

Figure 4:
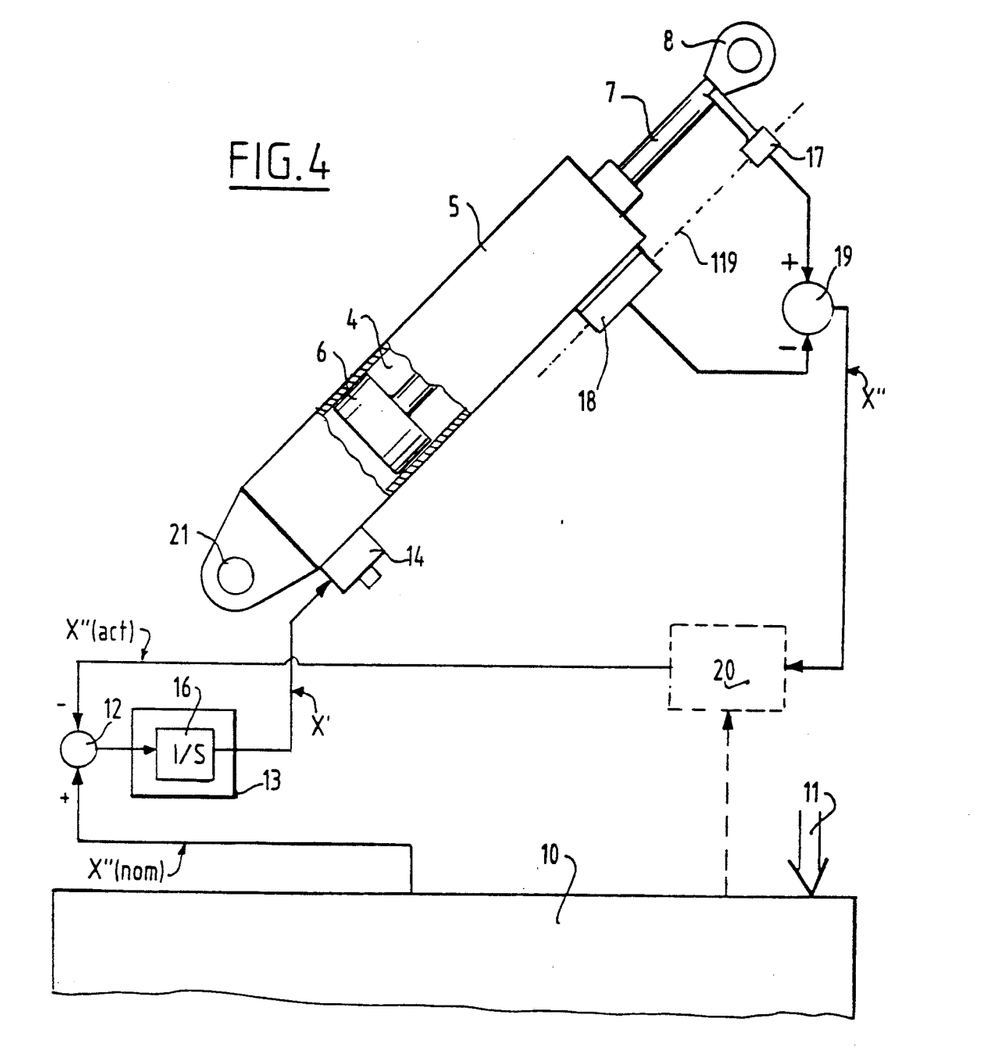
FIG. 4 is a control system according to the invention in a further embodiment.

FIG. 4 shows an embodiment, in which the acceleration transducer 15 is replaced by two acceleration transducers 17, 18, arranged at the plunger 7 and the cylinder house 5 respectively. As indicated with a stripe-dot-line 19, the acceleration transducers 17, 18 are exactly aligned. The output signals of transducers 17, 18 are supplied to a difference circuit 19, the output signal of which is as x(act) supplied to the inverting input of difference circuit 12. Dot-lines indicate a correction-circuit 20 controlled by computer 10 and serving the compensation for the difference in centrifugal accelerations of transducers 17 and 18, which namely have different arms relative to the hinging point 21 with frame 2.

Figure 5:
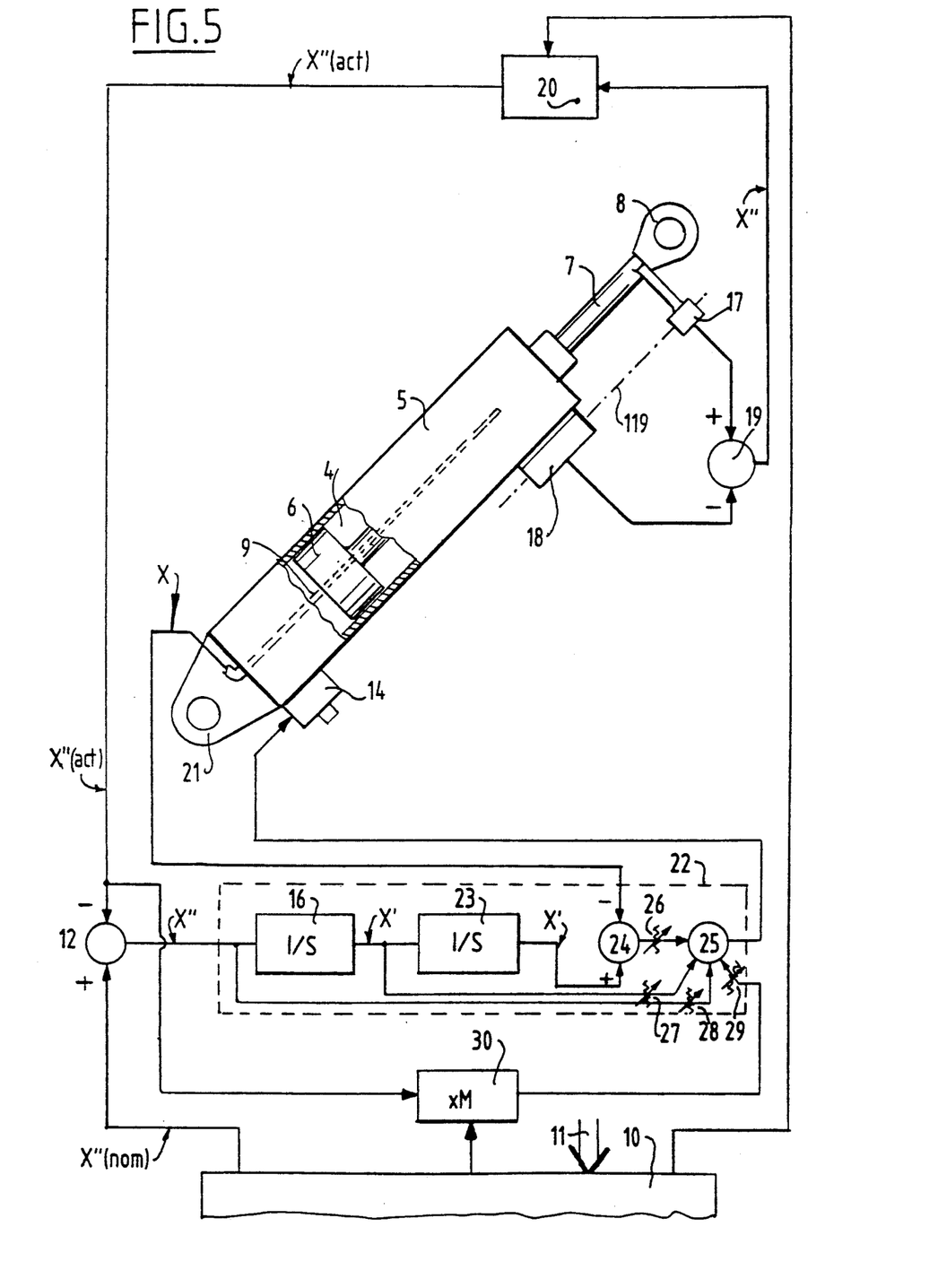
FIG. 5 is a control system according to the invention in a preferred embodiment.

FIG. 5 shows an embodiment, in which for a major part the same control system is used as shown in FIG. 4.

The embodiment according to FIG. 5, however, comprises a control assembly 22 indicated with an interrupted frame, and comprising a first integrator 16, a second integrator 23, a difference circuit 24 and a summing circuit 25. The output signal x' of the first integrator 16 is supplied to the second integrator 23. The output signal x thereof is supplied to the non-inverting input of difference circuit 24. To the inverting input thereof output signal x of position transducer 9 is supplied. The output signal of the difference circuit 24 is through an adjustable attenuator 26 supplied to the summing circuit 25 as a position-error signal. The output signal x' of the first integrator 16 is through an attenuator 27 supplied to summing circuit 25 as a velocity signal. The output signal x'' of the difference circuit 12 is through an adjustable attenuator 28 supplied to the summing circuit 25 as an acceleration signal.

The output signal x(act) of the correction-circuit 20 is also supplied to a multiplier 30, multiplying the related acceleration signal with a value of the actual effective mass calculated by computer 10 and supplies the related product-signal, therefore a force-signal through an attenuator 29 to the summing circuit 25.

The output signal of this summing circuit 25 is as a control signal supplied to the control valve 14.

It should be noted that in the figures the hydraulic system supplying the energy for the displacement of the piston 6 of the hydraulic cylinders 4, is not shown. This, however, is generally known technique.

Figure 6:
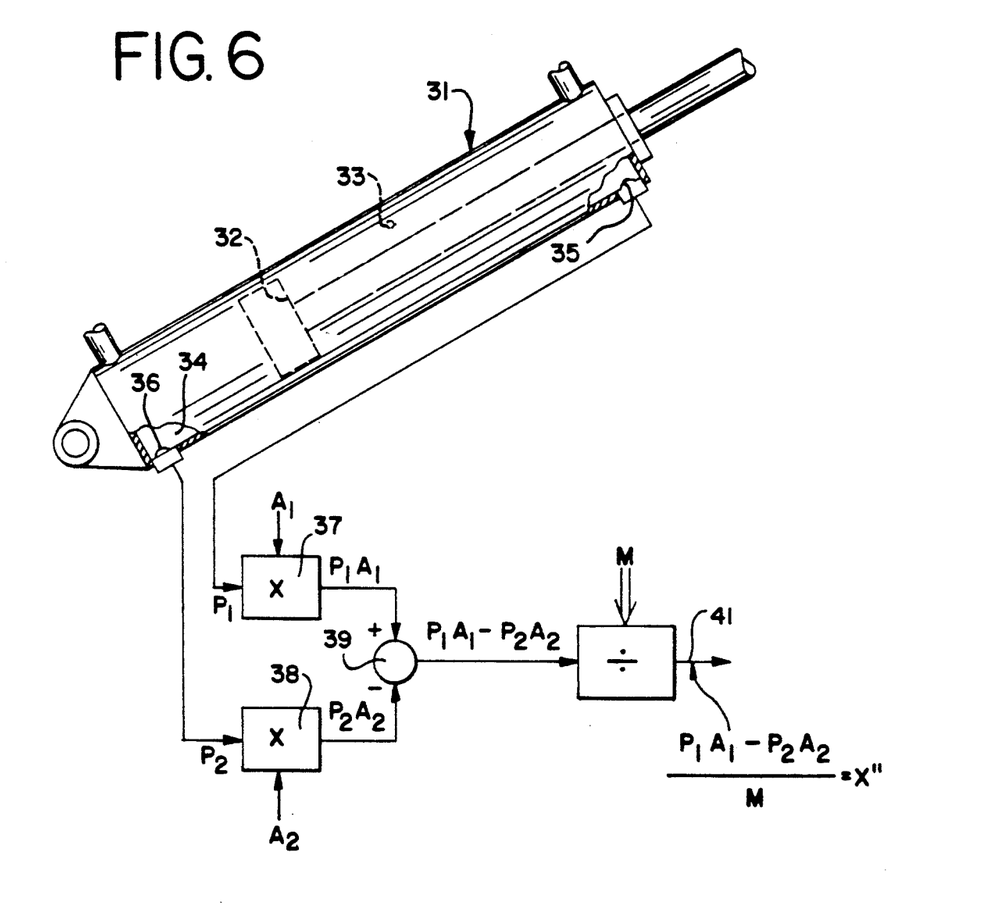
FIG. 6 is a control system according to the invention in a further alternative embodiment.

FIG. 6 shows schematically a hydraulic cylinder 31, in which the piston 32 separates a cylinder in two compartments, 33, 34 respectively. In those respective compartments pressure transducers 35, 36 are arranged generating pressure signals P1, P2, respectively, representative of the hydraulic pressures prevailing in the respective compartments 33, 34. These pressure signals are fed into multiplying means, 37, 38, respectively, in which they are multiplied with A1 and A2, respectively representing the effective piston areas at the sides of the respective compartments 33, 34. The output signals of multipliers 37, 38 are subtracted in subtractor 39, the output of which is fed into a divider 40 dividing the output of subtractor 39 by M, which is the value of the mass present at the end of the cylinder carrying the subframe. Thus, the output 41 provides the acceleration signal x". This signal x" can further be processed and used for control as described hereinbefore.

Since the value M is not a constant it can be preferably be calculated by a computer previously fed with relevant parameters, such as the mass distribution of the subframe, the effective rest length of the cylinder, the rest angle between the cylinder axis and the corresponding displacement of the subframe, etc. The computer performs such calculation on basis of the instantaneous value of the position of the subframe for all degrees of freedom, translation as well as rotation.

We claim:

1. A movement-simulator, comprising:
   at least one support frame;
   a subframe movable relative to the frame;
   a variable element having a first end connected to the support frame and a second end connected to the subframe, and a variable length, for effecting movement of the subframe relative to the support frame;
   a central control assembly electrically connected with the variable element, for controlling the length thereof; and
   acceleration measuring means attached to the variable element, the acceleration measuring means supplying an acceleration signal representing acceleration of the subframe relative to the support frame, to the central control assembly, acceleration measuring means comprising two pressure transducers for generating pressure signals, multiplying means for multiplying said pressure signals for generating respective force signals, subtracting means for subtracting said force signals for generating an effective force signal, and dividing means for dividing said effective force signal by the effective mass, thereby generating an acceleration signal with respect to the effective mass.

2. The movement-simulator of claim 1, wherein said central control assembly receives an instantaneous nominal value of the acceleration signal from a computer and adjusts the variable element until the acceleration signal and the nominal value substantially equal each other.

3. The movement-simulator as defined in claim 1, wherein the variable element comprises a hydraulic cylinder.

4. The movement-simulator of claim 1, further comprising:
   first, second and third support frames; and
   first, second and third pairs of variable elements, each variable element of each pair having a first end connected to a respective one of the first, second and third support frames and a second end connected to the subframe, each variable element having a variable length for effecting movement of the subframe relative to each support frame.

5. The movement-simulator of claim 4 wherein each variable element comprises:
   a hydraulic cylinder having a cylinder housing with a top end and a bottom end, the bottom end being connected to the respective one of the first, second and third support frames;
   a plunger having a top end and a bottom end, the top end being connected to the subframe, the bottom end being telescopically engaged to the top end of the cylinder housing; and
   a piston mounted to the bottom end of the plunger and inside the cylinder housing of the hydraulic cylinder.

6. The movement-simulator of claim 1, wherein the acceleration measuring means comprises a first acceleration transducer attached to the second end of the variable element and a second acceleration transducer attached between the first and second ends of the variable element, the first and second acceleration transducers being aligned, and producing acceleration signals.

7. The movement-simulator as defined in claim 6, further comprising:
   a difference circuit electrically connected to the first and second acceleration transducers for subtracting the acceleration signal of the second acceleration transducer from the acceleration signal of the first acceleration transducer; and
   a correction circuit electrically connected to the difference circuit and the central control assembly, the correction circuit receiving an acceleration signal from the difference circuit, and producing an output signal, the output signal being received by the central control assembly.

8. The movement simulator of claim 1 wherein the variable element is a cylinder in which a piston is slightably arranged separating the cylinder into first and second compartments, said compartments having first and second piston areas, said acceleration measuring means comprising:
   first and second pressure transducers, said first pressure transducer attached to said first compartment for generating a first pressure signal, said second pressure transducer attached to a second compartment for generating a second pressure signal; multiplying means for multiplying said first pressure signal by said first piston area and said second pressure signal by said second piston area to generate respective first and second force signals; subtracting means for subtracting first pressure signal from the second pressure signal for generating an effective pressure signal; dividing means for dividing said effective pressure signal by an effective mass present at an end of the cylinder carrying said subframe to generating an effective acceleration signal which is an output signal of the acceleration measuring means.

9. Movement-simulator according to claim 8, wherein the effective mass is calculated by a computer previously fed with relevant parameters, such as mass of the subframe, length of the cylinder, angle between the cylinder axis and the corresponding displacement of the subframe, said computer performing said calculation on basis of the instantaneous value of the actual position of the subframe for all degrees of freedom.

10. A movement-simulator, comprising:
at least one support frame;
a subframe movable relative to the support frame;
a variable element having a first end connected to the support frame and a second end connected to the subframe;
first and second acceleration transducers, the first acceleration transducer attached to the second end of the variable element, the second acceleration transducer attached between the first and second ends of the variable element, the first and second acceleration transducers being aligned in space;
a first difference circuit electrically connected to the first and second acceleration transducers, the first and second acceleration transducers producing output signals generated with respect to an effective mass, said acceleration signals which are received by said first difference circuit, wherein the output signals are subtracted from each other for forming an acceleration signal;
a correction circuit electrically connected to the first difference circuit, the correction circuit receiving the acceleration signal from the difference circuit;
a computer electrically connected to the correction circuit for controlling the correction circuit;
a second difference circuit electrically connected to the correction circuit and the computer, such that output from the correction circuit is received by the second difference circuit and output of a nominal acceleration from the computer is received by the second difference circuit; and
a first integrator electrically connected to the second difference circuit and to the variable element for converting output from the second difference circuit to a velocity signal and for providing the velocity signal to control the variable element.

11. The movement-simulator of claim 10 wherein the variable element comprises at least one hydraulic cylinder having a cylinder housing with top and bottom ends, a plunger with top and bottom ends telescopically engaged to the cylinder housing at the bottom end, and a piston connected to the bottom end of the plunger.

12. The movement-simulator of claim 11 further comprising a control valve attached to the bottom end of the cylinder housing of the hydraulic cylinder for controlling the feeding and outlet of oil under pressure to and from the hydraulic cylinder, the control valve electrically connected to the first integrator for receiving the velocity signal from the first integrator.

13. A movement-simulator, comprising:
at least one support frame;
at least one hydraulic cylinder having a cylinder housing, a plunger, and a piston, the plunger having first and second ends, the piston attached to the second end of the plunger, the cylinder housing having top and bottom ends, the bottom end of the cylinder housing connected to the support frame;
a subframe connected to the first end of the plunger of the hydraulic cylinder;
a position transducer attached to the cylinder housing;
a first acceleration transducer connected to the first end of the plunger;
a second acceleration transducer connected to a lateral surface of the cylinder housing at the top end, the first and second acceleration transducers being aligned in space;
a first difference circuit electrically connected to the first and second acceleration transducers;
a correction circuit electrically connected to the first difference circuit for receiving output from the first difference circuit;
a computer electrically connected to the correction circuit for controlling the correction circuit;
a second difference circuit electrically connected to the correction circuit for receiving output from the correction circuit, the second difference circuit electrically connected to the computer for receiving a nominal acceleration signal from the computer;
a multiplier electrically connected to the correction circuit and the computer for receiving and multiplying an actual acceleration signal from the correction circuit and an actual effective mass from the computer;
a first integrator electrically connected to the correction circuit for receiving the actual acceleration signal from the correction circuit;
a second integrator electrically connected to the first integrator for receiving a velocity signal from the first integrator;
a third difference circuit electrically connected to the second integrator for receiving a position signal from the second integrator, and to the position transducer for receiving a position signal;
a summing circuit electrically connected to the third difference circuit for providing an acceleration signal, the summing circuit electrically connected to the first integrator for receiving a velocity signal from the first integrator, the summing circuit electrically connected to the second difference circuit for receiving a position signal from the second difference circuit, the summing circuit electrically connected to the multiplier for receiving an acceleration signal from the multiplier; and
a control valve attached to the lateral surface at the bottom end of the cylinder housing to the hydraulic cylinder, the control valve electrically connected to the summing circuit for providing a control signal from the summing circuit to the control valve.

* * * * *

UNITED STATES PATENT AND TRADEMARK OFFICE
CERTIFICATE OF CORRECTION

PATENT NO. : 5,176,518
DATED : January 5, 1993
INVENTOR(S) : Jan Hordijk et al.

It is certified that error appears in the above-indentified patent and that said Letters Patent is hereby corrected as shown below:

Column 2, line 4, delete "has" and substitute --have--.

Column 5, line 23, delete "drawing" and substitute --drawings--.

Column 5, line 28, delete "drawing" and substitute --drawings--.

Column 7, line 25, delete "be".

Column 8, lines 45-46, delete "slightably" and substitute --slidably--.

Column 9, line 1, after "mass" insert --distribution--.

Column 9, line 2, before "length" insert --rest--; and before "angle" insert --rest--.

Signed and Sealed this

Fourth Day of July, 1995

Attest:

BRUCE LEHMAN

Attesting Officer

Commissioner of Patents and Trademarks